(12) United States Patent
Suzuki

(10) Patent No.: US 8,487,936 B2
(45) Date of Patent: Jul. 16, 2013

(54) PORTABLE ELECTRONIC DEVICE AND CHARACTER DISPLAY METHOD FOR THE SAME

(75) Inventor: Shoji Suzuki, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 863 days.

(21) Appl. No.: 12/130,780

(22) Filed: May 30, 2008

(65) Prior Publication Data

US 2008/0303824 A1 Dec. 11, 2008

(30) Foreign Application Priority Data

May 30, 2007 (JP) ................................. 2007-144216
May 19, 2008 (JP) ................................. 2008-130595

(51) Int. Cl.
*G06T 11/00* (2006.01)
*G09G 5/00* (2006.01)

(52) U.S. Cl.
USPC ............................ 345/467; 345/684; 345/685

(58) Field of Classification Search
USPC .................... 345/467, 684, 685, 688
See application file for complete search history.

(56) References Cited

U.S. PATENT DOCUMENTS

| | | | | |
|---|---|---|---|---|
| 4,186,393 A * | 1/1980 | Leventer | .................... | 345/469.1 |
| 4,481,602 A * | 11/1984 | Bohrer et al. | .................... | 708/1 |
| 4,712,102 A * | 12/1987 | Troupes et al. | ................ | 345/561 |
| 4,873,514 A * | 10/1989 | Nakagawa et al. | ............. | 345/26 |
| 5,477,240 A * | 12/1995 | Huebner et al. | ............. | 345/685 |
| 5,602,566 A * | 2/1997 | Motosyuku et al. | .......... | 345/684 |
| 6,011,549 A * | 1/2000 | Shoji et al. | ..................... | 345/684 |
| 6,292,176 B1 * | 9/2001 | Reber et al. | .................... | 345/169 |
| 6,392,660 B2 * | 5/2002 | Karjalainen | ................... | 345/660 |
| 6,508,436 B2 * | 1/2003 | Hsia | ............................ | 244/35 R |
| 6,512,522 B1 * | 1/2003 | Miller et al. | ................... | 345/474 |
| 6,721,423 B1 * | 4/2004 | Anderson et al. | ............. | 380/252 |
| 6,771,279 B2 * | 8/2004 | Syukri | .......................... | 345/684 |
| 7,057,617 B1 * | 6/2006 | Nishida | ......................... | 345/472 |
| 7,167,186 B2 * | 1/2007 | Credelle et al. | ............... | 345/613 |
| 7,293,244 B2 * | 11/2007 | Randall | ......................... | 715/784 |
| 7,307,632 B1 * | 12/2007 | Garritsen | ...................... | 345/471 |
| 7,478,325 B2 * | 1/2009 | Foehr et al. | ................... | 715/269 |
| 7,518,611 B2 * | 4/2009 | Boyd et al. | .................... | 345/473 |
| 7,580,039 B2 * | 8/2009 | Dowling et al. | ........... | 345/469.1 |
| 7,710,422 B2 * | 5/2010 | Matskewich et al. | ........ | 345/467 |
| 7,719,536 B2 * | 5/2010 | Dowling et al. | .............. | 345/467 |
| 7,768,513 B2 * | 8/2010 | Klassen | ......................... | 345/467 |
| 2004/0183817 A1 * | 9/2004 | Kaasila | ......................... | 345/660 |
| 2005/0134600 A1 * | 6/2005 | Credelle et al. | ............... | 345/589 |
| 2007/0097025 A1 * | 5/2007 | Itoh et al. | ......................... | 345/50 |
| 2007/0155298 A1 * | 7/2007 | Sung | .............................. | 451/527 |
| 2007/0205992 A1 * | 9/2007 | Gloyd et al. | .................... | 345/169 |
| 2008/0040687 A1 * | 2/2008 | Randall | ......................... | 715/830 |

FOREIGN PATENT DOCUMENTS

JP 2006-054581 2/2006

\* cited by examiner

*Primary Examiner* — M Good Johnson
(74) *Attorney, Agent, or Firm* — Duane Morris LLP

(57) ABSTRACT

A portable electronic device including a display unit uses a still character font and a scroll character font. The display unit can scroll through one or more images on a screen. The still character font is used for characters on a still screen. The scroll character font is used for characters on a scroll screen, and has the same characters as those of the still character font, the characters of the scroll character font having at least one different visual characteristic when compared to corresponding characters of the still character font.

22 Claims, 4 Drawing Sheets

(SCROLL DIRECTION)

PORTABLE ELECTRONIC DEVICE AND CHARACTER DISPLAY METHOD FOR THE SAME

CROSS REFERENCE TO RELATED APPLICATION(S)

The present application claims priority under 35 U.S.C. §119 to Japanese Patent Application No. 2007-144216, filed May 30, 2007, entitled "IMAGE PICKUP APPARATUS AND METHOD AND APPARATUS FOR MANUFACTURING THE SAME," the entirety of which is incorporated by reference herein. The present application also claims priority under 35 U.S.C. §119 to Japanese Patent Application No. 2008-130595, filed on May 19, 2008, entitled "IMAGE PICKUP APPARATUS AND METHOD AND APPARATUS FOR MANUFACTURING THE SAME," the entirety of which is incorporated by reference herein.

BACKGROUND OF THE INVENTION

1. Field of the Invention

The present invention relates to portable electronic devices having a display unit for displaying images, graphics, characters, etc., and, more particularly, to a method and apparatus for displaying characters and graphics on a display unit of a portable electronic device.

2. Description of the Related Art

Liquid crystal displays (LCDs) are generally employed as display units of existing portable electronic devices. Typically, LCDs can display still images, moving images (e.g., video), computer graphic images, objects and characters (e.g., alphanumeric text).

In order to maintain portability, the size of an LCD used in a portable electronic device is typically limited. Accordingly, when the portable electronic device displays an image, a character string, or the like, which is not smaller than a predetermined size, the portable electronic device partially displays only a portion of the image, character string, or the like. After that, when an operation unit (e.g., a cross key) is operated in a predetermined direction (e.g., up, down, right, or left), the portable electronic device displays a different part of the image, character string, or the like. This display processing is called "scrolling."

Since the LCD has a low response speed, during scrolling, a character or the like appears to leave a trail and/or flickers as it scrolls or moves across the LCD's viewable display area. This phenomenon is quite noticeable, for example, in LCDs based on Vertical Alignment (VA) and In-Plane-Switching (IPS) that have been employed for increased viewing angles used in recent years.

Accordingly, in devices incorporating a dot-scroll display, for example, previous methods of reducing the trailing and/or flickering effects during scrolling employed switching reference voltages in order to perform smoother scrolling, thereby increasing the response speed of the dot-scroll display. This method is known as the "overdrive processing method", and is generally used to increase the response speed of the display.

In the overdrive processing method, when a data-change direction from a preceding frame to the present frame is positive (i.e., "a rise"), an applied voltage higher than usual is applied to the liquid crystal, whereas when the data-change direction from the preceding frame to the present frame is negative (i.e., "a fall"), an applied voltage lower than usual is applied to the liquid crystal, whereby a response time is shortened to provide smoother display transitions. In an LCD display unit, by using the overdrive processing method, a response speed of moving images can be increased and undesired residual images or effects that occur when moving images are displayed can be eliminated or reduced.

However, the overdrive processing method needs a large-scale and expensive driver integrated circuit (IC) or the like. Therefore, for portable electronic devices having relatively small housings, it is preferable to solve the problems of trailing and/or flickering during scrolling without providing any overdrive processing function.

BRIEF SUMMARY OF THE INVENTION

The present invention addresses the above and other needs by providing a method and apparatus that provides at least one alternative font when characters are moving or scrolling across a display screen, but does not provide an alternative font when characters are not moving or scrolling on the display screen. As used herein the term "font" refers to visual characteristics and features of graphic objects or characters (collectively referred to herein as "characters") that define an appearance of the characters.

According to an aspect of the present invention, a portable electronic device includes a display unit. The display unit can scroll through images on a screen. The portable electronic device uses a still character font and at least one scroll character font. The still character font is used on a still screen. The scroll character font is used when it is detected that the characters are scrolling across the screen as moving images. When images are scrolling across the screen, the screen is referred to herein as a "scroll screen." The scroll character font has the same characters as the still character font but further includes at least one different visual characteristic or feature for each character.

According to another aspect of the present invention, a portable electronic device includes a display unit. The display unit can scroll through images on a screen. The device also includes means for displaying a character font on a still screen on the display unit and means for displaying a character of a second character font on a scroll screen on the display unit. The character of the second character font is the same as the character of the first character font but includes at least one portion or feature having a different color tone.

According to a further aspect of the present invention, a character display method for a portable electronic device, which includes a display unit that displays screens and a memory, includes: enabling scrolling of a screen displayed on the display unit; determining whether or not scrolling is being performed, acquiring character information from the memory on the basis of whether scrolling is being performed, and using the acquired character information to display, on the display unit, as the character included in the screen, a character of a still character font or a scroll character font.

DETAILED DESCRIPTION OF EXEMPLARY EMBODIMENTS

In the following description of exemplary embodiments, reference is made to the accompanying drawings which form a part hereof, and in which it is shown by way of example specific embodiments in which the invention may be practiced. It is to be understood that other embodiments may be utilized and structural changes may be made without departing from the scope of the present invention.

Figure 1:
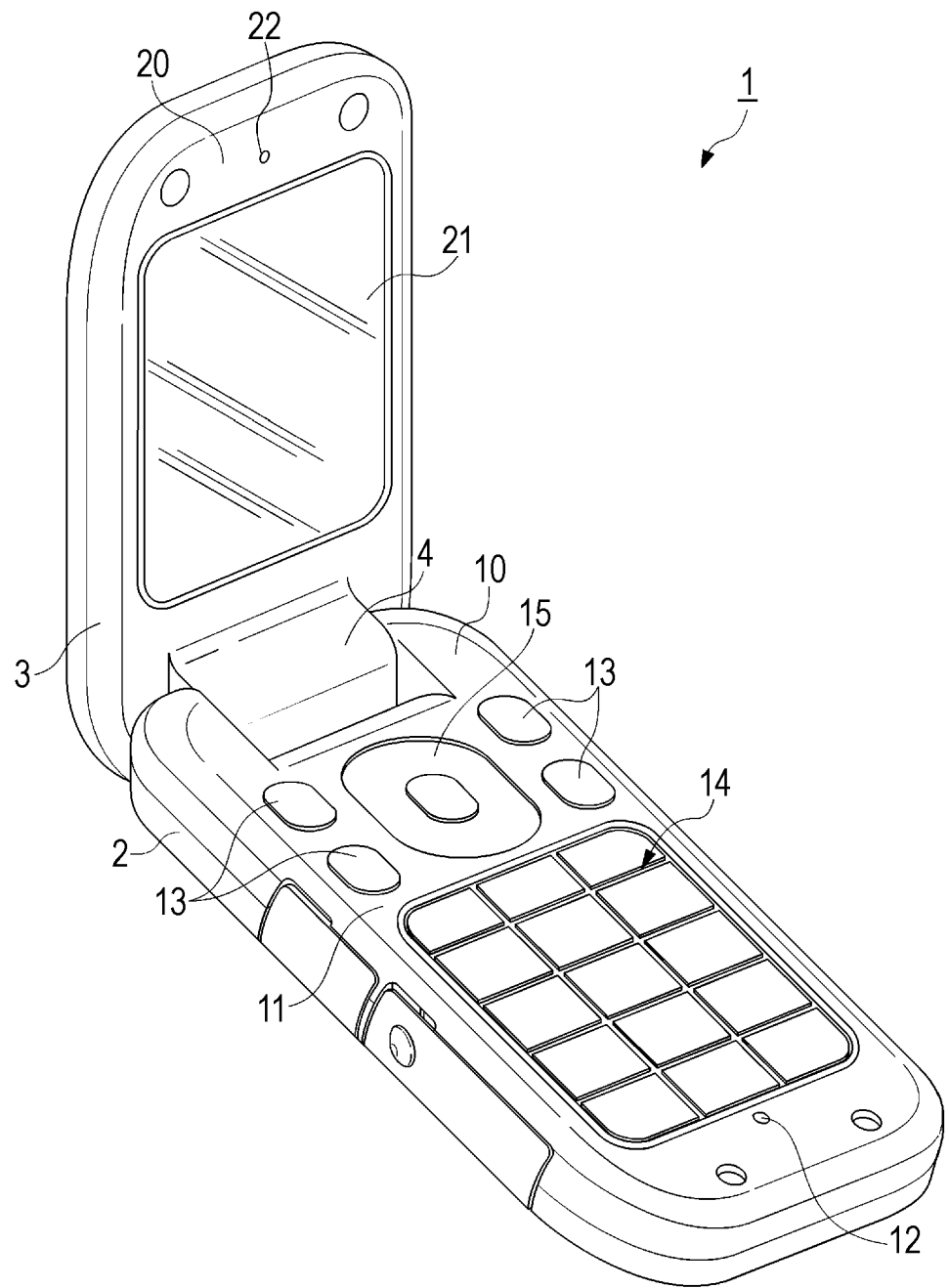
FIG. 1 is a perspective view showing the exterior of a cellular phone according to one embodiment of the present invention.

As shown in FIG. 1, a cellular phone 1, which is an example of a portable electronic device, has an operation-side housing part 2 and a display-side housing part 3.

A surface 10 of the operation-side housing part 2 has thereon an operation unit 11 and a microphone 12. The operation unit 11 includes functional setting and operation buttons 13, input operation buttons 14, and a selection button 15. The functional setting and operation buttons 13 are used to activate various settings, and various functions such as a telephone directory function and an electronic mail function, for example. The input operation buttons 14 are used to input numerals of a telephone number, characters of an e-mail, or the like, etc. The selection button 15 is used to perform selections in each of various operations, scrolling, etc. The microphone 12 receives speech generated during a call of a user of the cellular phone 1.

The display-side housing part 3 has, on a surface 20, an LCD display unit 21 for displaying various types of information, images, characters, etc., and a speaker 22 for outputting speech of a communicating party during a call, for example.

An upper end portion of the operation-side housing part 2 is joined to a lower end portion of the display-side housing part 3 through a hinge mechanism 4. By turning the operation-side housing part 2 relative to the display-side housing part 3 that are joined to each other via the hinge mechanism 4, the cellular phone 1 can be allowed to be in an open state in which the operation-side housing part 2 and the display-side housing part 3 are mutually opened, or a closed state in which the operation-side housing part 2 and the display-side housing part 3 are folded.

Figure 2:
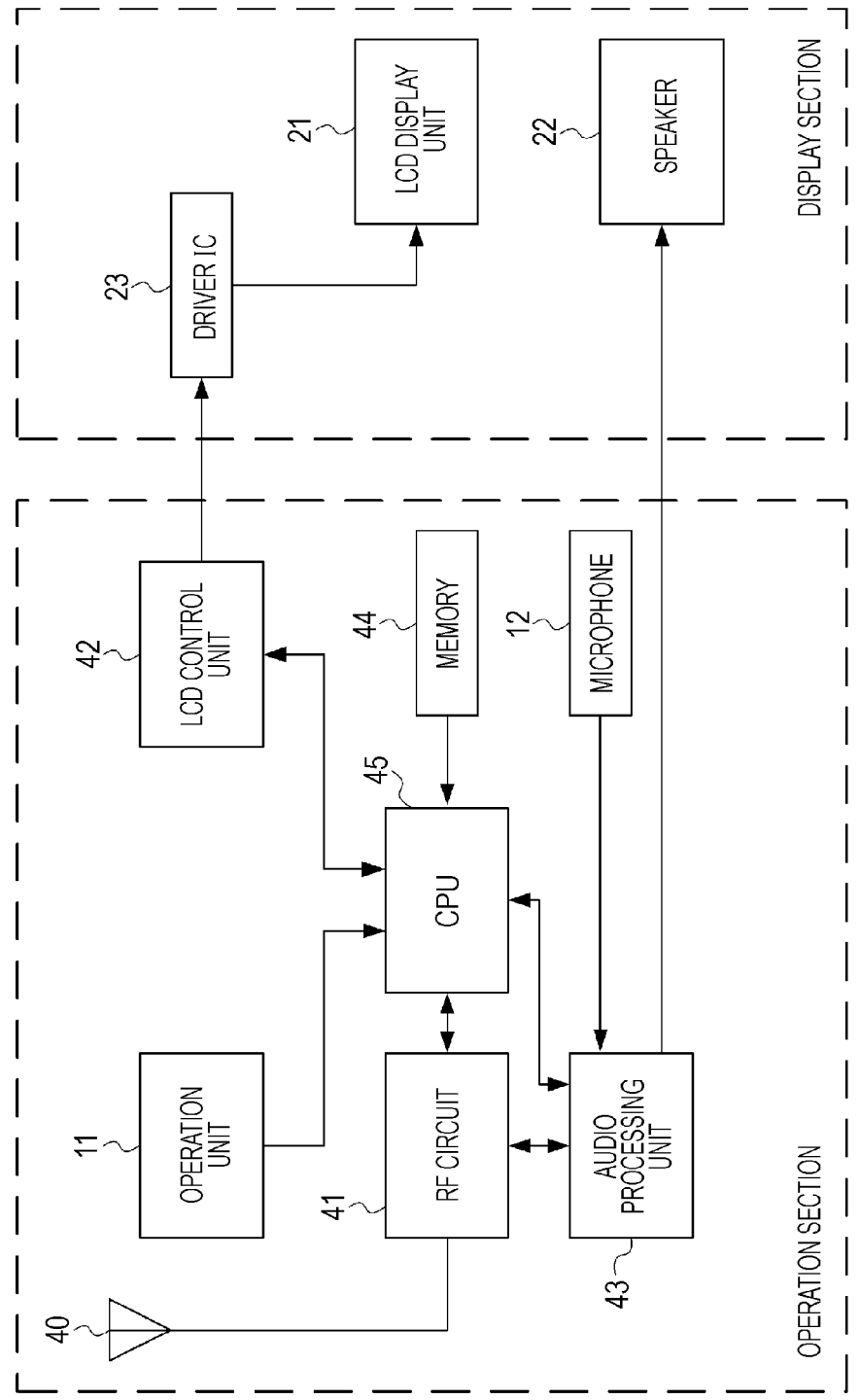
FIG. 2 is a block diagram showing functions of the cellular phone according to one embodiment of the present invention.

As shown in FIG. 2, the cellular phone 1 includes an operation section and a display section. The operation section includes the operation unit 11, the microphone 12, a main antenna 40, a radio frequency (RF) circuit 41, an LCD control unit 42, an audio processing unit 43, a memory 44, and a central processing unit (CPU) 45. The display section includes the LCD display unit 21, the speaker 22, and a driver integrated circuit (IC) 23.

The main antenna 40 is used to communicate in a predetermined working frequency band (e.g., the 800-MHz band) with an external apparatus (such as a base station) connected to a public telecommunication network. Although the 800-MHz band is used as the predetermined working frequency band in this embodiment, other frequency bands may be used. The main antenna 40 may be used for dual band use and may be used not only for the predetermined working frequency band, but also for another working frequency band (e.g., the 2-GHz band).

The RF circuit 41 demodulates a signal received from a base station or the like via the main antenna 40, and supplies the demodulated signal to the CPU 45. In addition, the RF circuit 41 modulates a signal supplied from the CPU 45, and transmits the modulated signal to the external apparatus (base station) via the main antenna 40.

The main antenna 40 and the RF circuit 41 can perform communications with a predetermined server on a public telecommunication network via a base station under the control of the CPU 45 and on the basis of an operation input by the operation unit 11.

Under the control of the CPU 45, the LCD control unit 42 performs predetermined image processing, and supplies processed image data to the driver IC 23. The driver IC 23 stores the image data supplied from the LCD control unit 42 in a frame memory (not shown), and outputs the image data to the LCD display unit 21 at predetermined points in time. The image data also includes image data such as a Web page screen acquired from a predetermined server via the main antenna 40 and the RF circuit 41.

Under the control of the CPU 45, the audio processing unit 43 performs predetermined audio processing on a signal supplied from the RF circuit 41, and supplies processed signals to the speaker 22. The speaker 22 outputs the signal supplied from the audio processing unit 43 to the exterior.

In addition, under the control of the CPU 45, the audio processing unit 43 processes a signal input from the microphone 12, and supplies the processed signal to the RF circuit 41. The RF circuit 41 performs predetermined processing on the signal supplied from the audio processing unit 43, and supplies the processed signal to the main antenna 40.

The memory 44 stores a still character font and at least one scroll character font corresponding to the still character font. Both fonts can be included in an image displayed on the LCD display unit 21.

In one embodiment, the scroll character font has a color tone identical to that of a color used in a still character font corresponding to the same character, except at one or more edges of a character. The character edge represents a region having a width of at least one dot at an edge of the character. Coloration of the character edge is adjusted to have a color tone deeper or lighter than that of a color used for the still character font. In one embodiment, a deeper color tone is, for example, a color tone deeper than that of the color used for the still character font and that of the color used for a background. A lighter color tone is that of a color between the color used for the still character font and the color used for the background. In a further embodiment, a character edge on a forward side of a scroll direction has a deeper color tone, and a character edge on a rearward side of the scroll direction has a lighter color tone.

Figure 3A:
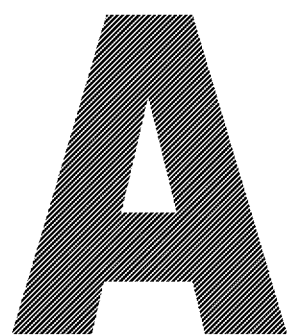
FIG. 3A is an illustration showing a character of a still character font.
Figure 3B:
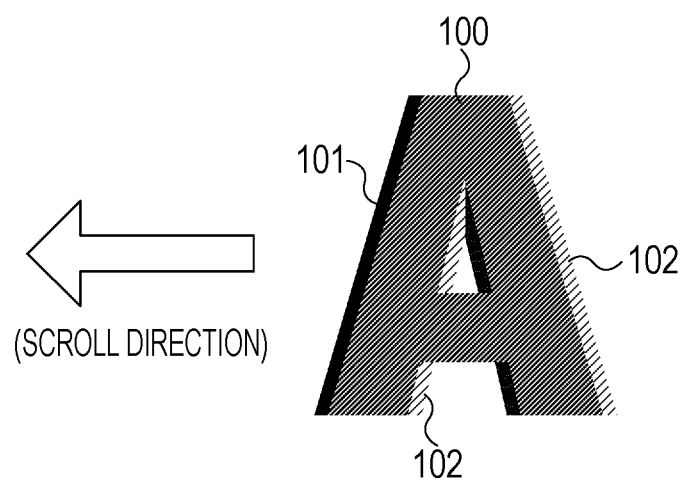
FIG. 3B is an illustration showing a character of a scroll character font, in accordance with one embodiment of the invention.

Exemplary still and scroll character fonts for the character "A" of the English alphabet are described below. FIG. 3A illustrates the character "A" as it would appear in a still character font, in accordance with one embodiment of the invention. In contrast, FIG. 3B illustrates the same character "A" in a scroll character font, in accordance with one embodiment of the invention. By comparing FIGS. 3A and 3B, it can be seen that the scroll character font has the same or similar color as the still character font, except at the character edges. As shown in FIG. 3B, the scroll character font has three parts, a main part 100, a forward edge part 101 and rearward edge part 102. The coloration of the forward edge part 101, which is a region having a width of at least one dot of a character edge corresponding to the forward side in the scroll direction, is adjusted to have a color tone deeper than that of the main part 100 and different from that of the color used for the background. In addition, coloration of the backward part 102, which is a region having a width of at least one dot of a character edge corresponding to the backward side in the scroll direction, is adjusted to have a color tone lighter than that of the main part 100, and similar to that of the color used for the background. More specifically, the "deeper color tone" represents a color tone that is made at a distance from a gradation value of the background color, for example, by increasing a gradation value of a color used for the font. The "lighter color tone" represents a color tone that is made close to the gradation value of the background color, for example, by decreasing the gradation value of the color used in the font. The relation of these light/deep color tones can be reversed if the color tone of the background is deeper than that of the character font, in accordance with another embodiment of the invention.

Since an image displayed on the LCD display unit 21 can be scrolled in up, down, right, and left directions, in one embodiment, there is a scroll character font corresponding to each of the individual directions. In other words, in addition to at least one type of still character font, four types of scroll character fonts are provided, for example, corresponding to each of the up, down, right and left directions of scrolling. In a further embodiment, the invention may provide a scroll character font that has one or more color tones deeper than that of the color used for the background, and a scroll character font that has one or more color tones that are lighter than that of the color used for the background. As described above, in one embodiment, the invention provides scroll character fonts corresponding to not only scroll directions, but also various fonts corresponding to combinations of background colors and character colors.

The memory 44 stores all character fonts. In one embodiment the characters of the still character font and the scroll character fonts are respectively associated with, for example, character codes in the American Standard Code for Information Interchange (ASCII) code.

The CPU 45 typically controls the entirety of the cellular phone 1, and can perform predetermined control functions for the RF circuit 41, the LCD control unit 42, the audio processing unit 43, and a camera (not shown), for example.

In one embodiment, the CPU 45 acquires screen information including characters from a different server (not shown) via the RF circuit 41, and generates screen information on the basis of an operation on the operation unit 11. In one embodiment, when a screen to be displayed is a Web page, the CPU 45 extracts character codes and a code specifying a background color from drawing information for the Web page described in HyperText Markup Language (HTML) associated with the Web page. Alternatively, when the CPU 45 itself generates a display screen, the CPU 45 specifies a background color from the memory 44 on the basis of a function operating at that time, and extracts the character codes of characters to be displayed.

The CPU 45 then uses the acquired character codes to search the memory 44 for specifying a character font, and controls the LCD display unit 21 to draw characters on the background on the basis of the specified character font.

In addition, when an image that is not smaller than a predetermined size, such as a Web page, is displayed, the CPU 45 controls the LCD display unit 21 to perform partial display of the image. When the operation unit 11 has been pressed in desired direction (e.g., up, down, right, or left direction) for a predetermined time or longer, the CPU 45 performs a "scroll control" function in which an already displayed part is moved oppositely to the selected direction and a previously un-displayed part of the image is moved in the selected direction to be partially displayed.

Figure 4:
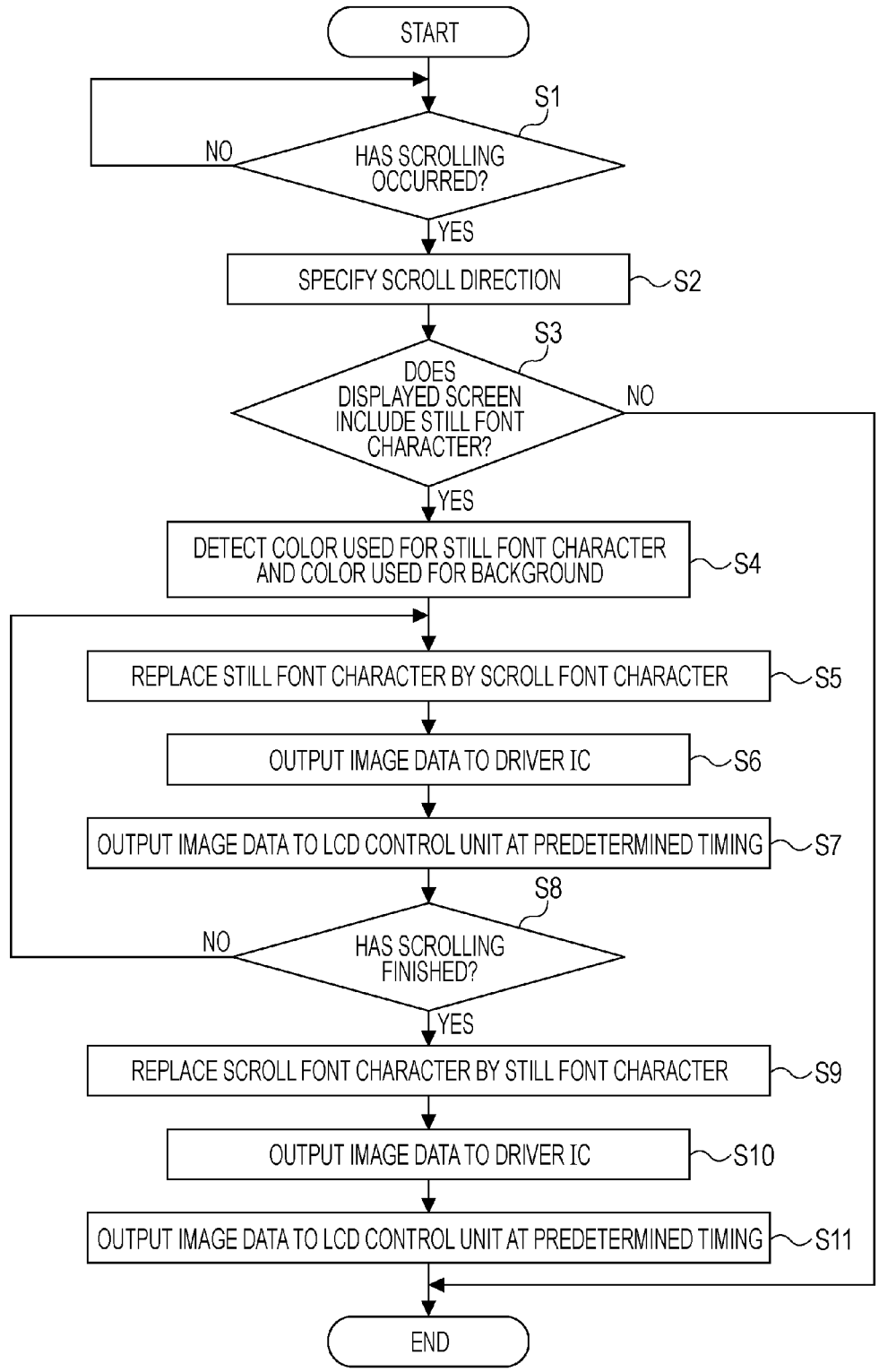
FIG. 4 is a flowchart of a scroll control process, in accordance with one embodiment of the invention.

The flow of scroll control performed by the CPU 45 when an image such as a Web page is partially displayed by the LCD display unit 21 is described below with reference to the flowchart shown in FIG. 4, in accordance with one embodiment of the invention.

In step S1, the CPU 45 determines whether or not a predetermined operation has been performed on the operation unit 11, that is, whether or not scrolling has occurred. In one embodiment, the CPU 45 determines whether or not a directional operation key (cross key) of the operation unit 11 has been pressed for a predetermined time or longer when an image is displayed on the LCD display unit 21. If a predetermined operation has been performed on the operation unit 11, the CPU 45 proceeds to step S2.

In step S2, the CPU 45 specifies a scroll direction. The CPU 45 specifies the scroll direction on the basis of a direction in which the predetermined operation has been performed.

In step S3, the CPU 45 determines whether or not the image displayed on the LCD display unit 21 includes a still character font. A determination as to whether the still character font is included in an image where it has already been drawn, can be performed by referring to the LCD control unit 42. In one exemplary embodiment, the CPU 45 refers to drawing information that it has processed most recently, such as HTML information. Then, the CPU 45 determines whether or not the HTML information includes an ASCII code. If the CPU 45 determines that an image drawn by the LCD control unit 42 includes the ASCII code (still character font), the CPU 45 identifies the character code and proceeds to step S4.

In step S4, the CPU 45 detects a color used for the still character font and a color used for a background.

In step S5, the CPU 45 performs control so that the still character font is replaced by a scroll character font.

In one embodiment, the CPU 45 determines a scroll character font on the basis of the identified character code, the color, detected in step S4, used for the still character font, and the color, detected in step S4, used for the background. In other words, the CPU 45 searches the memory 44 and selects a scroll character font which partially has the deeper tone and the lighter tone corresponding to the scroll direction (such as the forward part 101 and rearward part 102 in FIG. 3), and which corresponds to the same character codes. The CPU 45 controls the LCD control unit 42 to generate a screen in which the still character font is replaced by the selected scroll character font having the same character code.

In step S6, the LCD control unit 42 supplies, to the driver IC 23, image data concerning the screen in which the still character font is replaced by the scroll character font. At this time, the LCD control unit 42 does not particularly replace information other than the character font.

In step S7, the driver IC 23 stores the image data supplied from the LCD control unit 42 in the frame memory, and outputs to the LCD display unit 21 at predetermined points in time.

In step S8, the CPU 45 determines whether or not scrolling has finished. In one embodiment, the CPU 45 determines whether or not a pressing operation on the directional operation key of the operation unit 11 has been released. If a pressing operation on the directional operation key of the operation unit 11 has been released, the CPU 45 proceeds to step S9. If a pressing operation on the directional operation key of the operation unit 11 has not been released, the CPU 45 repeats steps S5 through S7.

In step S9, from the memory 44, the CPU 45 reads a still character font corresponding to the scroll character font displayed on the LCD display unit 21, both characters having identical character codes. The CPU 45 controls the LCD control unit 42 to replace the scroll character font by the still character font. In other words, when the scrolling operation has finished, the CPU 45 returns the present character font to the character font prior to occurrence of the scrolling.

In step S10, the LCD control unit 42 supplies image data to the driver IC 23.

In step S11, the driver IC 23 stores the image data supplied from the LCD control unit 42 in the frame memory, and supplies the image data to the LCD display unit 21 at predetermined points in time.

As described above, according to one embodiment, when a scrolling operation is detected, a still character font is replaced by a scroll character font that reduces display aberrations such as image trails and flickering without the need for expensive processing circuitry. Therefore, when scrolling is performed, special visual effects provided by the selected scroll font reduce display aberrations such as image flickering and trailing.

In one embodiment, the special visual effects are applied only to character images (e.g., alphanumeric text) on the display, which are most effected by scrolling, and do not influence a different portion (e.g., a graphic image or picture portion) of the image, which are not as significantly effected by scrolling. Thus, the LCD display unit 21 can display an easily viewable screen as a whole. In addition, processing performed in the embodiment is simplified. Thus, the load on the CPU 45 is small, so that a significant decrease in scroll speed can be avoided.

In one embodiment, predetermined scroll character fonts corresponding to different scrolling directions are stored in the memory 44 beforehand. However, in alternative embodiments, the invention may be implemented by processing and altering a still character font. For example, in one embodiment, a predetermined look-up table that defines a gradation value of a region having a width of at least one dot at an edge of a still character font on the basis of a scrolling direction and a background color is stored in the memory 44 beforehand. When scrolling occurs, by referring to the look-up table, the still character font may be processed and changed as desired. In other words, the look-up table is used to perform processing that enhances an edge of a still character font for the scroll direction. In addition, the look-up table is used to generate an intermediate gradation difference, which can hardly be visually recognized, between a region having a width of at least one dot at an edge of a still character font and a different region (such as a background color). When scrolling occurs, on the basis of a scrolling direction and a background color, by referring to the look-up table, processing which generates a font in which an edge region of a still character font has been changed to have a predetermined gradation value may be performed.

Although the invention has been described above in the context of cellular phone 1, in accordance with one embodiment, it is understood that the cellular phone 1 illustrated in FIG. 1 is only one example of a portable electronic device, which may advantageously incorporate the invention described herein. Other types of portable electronic devices may include, for example, a personal handy phone system (PHS), a personal digital assistant (PDA), a portable navigation apparatus, and a notebook personal computer.

Additionally, the invention may be embodied in various types of cellular phones such as "slider" cellular phones having one portion of its housing configured to slide transversely with respect to a second portion of its housing to provide open and closed states, a turning cellular phone in which one housing can be turned around an axis along a superposition direction, and a cellular phone in which an operation unit and a display unit are disposed in a single housing and fixed with respect to one another. Additionally, alternative forms of control buttons or input means may be utilized by portable electronic devices, in accordance with the present invention. For example, scrolling may be performed by sliding a finger or stylus across a touch pad or screen and/or control functions may be selected via manipulation of a touch pad or screen using presently existing touch sensing technologies.

Furthermore, although the embodiments above are described in the context of displaying a Web page using HTML and ASCII codes, the invention is not limited to such HTML Web pages. For example, other types of Web pages described in the Handheld Device Markup Language (HDML) and an eXtensible Markup Language (XML) may be displayed in accordance with the invention. In addition to the display of Web pages, the present invention can be practiced, for example, to display sent and received electronic mail messages and display a function menu, or any other types of characters that can be scrolled across a display screen.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A portable electronic device comprising a display unit capable of scrolling through images on a screen, wherein the portable electronic device uses:
   a still character font used for at least one character on a still screen; and
   a plurality of scroll character fonts used for at least one character on a scroll screen, each scroll character font having at least some of the same characters as the still character font,
   wherein each scroll character font has at least one different visual characteristic when compared to the still character font, wherein one of the plurality of scroll character fonts replaces the still character font for one or more of the at least one character on the scroll screen when scrolling through the images on the screen, the one scroll character font selected to replace the still character font being determined based on a scroll direction of the scrolling such that at least one of a forward side of a plurality of characters of the one scroll character font facing the scroll direction and a rearward side of the plurality of characters facing away from the scroll direction is visually different when compared to corresponding characters of the still character font.

2. The portable electronic device according to claim 1, further comprising:
an input operation unit configured to direct the scrolling through images on the screen; and
a control unit configured to control the display unit to display a character by using one of the still and scroll character fonts when the display unit displays a screen including the character, wherein,
when the input operation unit does not direct the scrolling through images on the screen, the control unit employs the still character font, and
when the input operation unit directs the scrolling through images on the screen, the control unit employs the scroll character font.

3. The portable electronic device according to claim 2, further comprising a memory storing the still character font and the at least one scroll character font.

4. The portable electronic device according to claim 2, further comprising a memory storing the still character font and the at least one scroll character font for one set of character codes, wherein the control unit searches the memory for one of the still character font or the scroll character font, which corresponds to the character code of the character, and controls the display unit to perform character drawing by using the font searched for.

5. The portable electronic device according to claim 2, further comprising a memory storing the still character font and a predetermined table, wherein the scroll character font is generated by processing and altering the still character font on the basis of the predetermined table.

6. The portable electronic device according to claim 1, wherein, when a character of the scroll character font is compared with a corresponding character of the still character font, a color of a first edge of the character of the scroll character font is different than a color of the corresponding character of the still character font, and a color of other parts of the character of the scroll character font are the same as the color of the character of the still character font.

7. The portable electronic device according to claim 6, wherein the color of the first edge of the character of the scroll character font has a color tone deeper than a color tone of the color of the other parts.

8. The portable electronic device according to claim 7, wherein, when the display unit displays the screen including a character, the display unit also displays a predetermined background color as a background for the character, which is to be drawn, and the color of the first edge of the character of the scroll character font is set to have a deeper color tone that is different from a color tone of the predetermined background color and a color tone of the color of the still character font.

9. The portable electronic device according to claim 6, wherein the color of a second edge of the character of scroll character font has a color tone lighter than a color tone of the colors of the other parts.

10. The portable electronic device according to claim 9, wherein, when the display unit displays a screen including a character, the display unit also displays a predetermined background color as a background for the character, which is to be drawn, the color tone of the second edge is set to be darker than a color tone of the predetermined background color and lighter than the color tone of the still character font.

11. The portable electronic device according to claim 6, wherein the first edge is a region having a width of at least one dot at a character edge.

12. The portable electronic device according to claim 6, wherein the first edge comprises a forward edge with respect to a predetermined scroll direction.

13. The portable electronic device according to claim 12, wherein,
when the display unit displays a screen including a character, the display unit also displays a predetermined background color as a background for the character, which is to be drawn, wherein
the color of the forward edge has a color tone deeper than a color tone of a corresponding character of the still character font, and a color of a rearward edge of the character has a color tone lighter than a color tone of the corresponding character of the still character font.

14. The portable electronic device according to claim 1, wherein, when scrolling in a first scroll direction among a plurality of scroll directions, a first scroll character font among a plurality of different scroll character fonts is used, and, when scrolling in a second scroll direction among the plurality of scroll directions, a second scroll character font among the plurality of different scroll character fonts is used.

15. The portable electronic device according to claim 14, wherein,
when a character of the first scroll character font is compared with a corresponding character of the still character font, a color of at least a forward edge and a rearward edge with respect to the first scroll direction is different, and wherein,
when a character of the second scroll character font is compared with a corresponding character of the still character font, a color of a forward edge and a rearward edge with respect to the second scroll direction is different.

16. The portable electronic device according to claim 15, wherein the color tone of a character of the first scroll character font on the forward edge in the first scroll direction is identical to the color tone of a character of the second scroll character font on the forward edge in the second scroll direction.

17. The portable electronic device according to claim 15, wherein the forward and rearward edges of the characters corresponding to the first and second scroll character fonts are each one dot in width.

18. The portable electronic device according to claim 14, wherein the input operation unit is capable of directing scrolling in up, down, right and left directions on the display unit.

19. The portable electronic device according to claim 18, wherein the portable electronic device uses a different scroll character font corresponding to each scrolling direction.

20. The portable electronic device according to claim 14, wherein, if termination of scrolling is detected, use of the still character font is resumed.

21. A portable electronic device comprising:
a display unit capable of scrolling through images on a screen;
means for displaying at least one character of a still character font on a still screen on the display unit; and means for displaying at least one character of a plurality of scroll character fonts on a scroll screen on the display unit, the at least one character of the plurality of scroll character fonts having at least some of the same characters as the still character font, each scroll character font including at least a portion having a different color tone than a color tone of the still character font, wherein one of the plurality of scroll character fonts replaces the still character font for one or more of the at least one character on the scroll screen when scrolling through the images on the screen, the one scroll character font selected to replace the still character font being determined based on a scroll direction of the scrolling such that at least one of a forward side of a plurality of characters of the one scroll character font facing the scroll direction and a rearward side of the plurality of characters facing away from the scroll direction is visually different when compared to corresponding characters of the still character font.

22. A character display method for a portable electronic device comprising a display unit that displays images, and a memory, the character display method comprising the steps of:

enabling scrolling of an image displayed on the display unit, the image comprising at least one character;

acquiring character information from the memory on the basis of a direction of the scrolling; and replacing a still character font of the at least one character with a scroll character font based on the acquired character information and displaying, on the display unit, the at least one character included in the image, wherein at least one of a forward side of the at least one character of the scroll font facing the scroll direction and a rearward side of the at least one character facing away from the scroll direction is visually different when compared to a corresponding character of the still character font.

* * * * *